(12) United States Patent
Aono (10) Patent No.: US 7,668,689 B2
(45) Date of Patent: Feb. 23, 2010

(54) VELOCITY DETECTION APPARATUS

(75) Inventor: Ryuji Aono, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 161 days.

(21) Appl. No.: 11/949,816

(22) Filed: Dec. 4, 2007

(65) Prior Publication Data

US 2008/0133172 A1 Jun. 5, 2008

(30) Foreign Application Priority Data

Dec. 5, 2006 (JP) ............................. 2006-328311

(51) Int. Cl.
*G06F 15/00* (2006.01)

(52) U.S. Cl. ..................................................... 702/142

(58) Field of Classification Search ................. 702/142, 702/147; 318/799
See application file for complete search history.

(56) References Cited

U.S. PATENT DOCUMENTS

| | | | | |
|---|---|---|---|---|
| 5,752,092 | A | * | 5/1998 | Ohishi et al. .................. 396/53 |
| 2004/0207392 | A1 | | 10/2004 | Kernhof |
| 2006/0145648 | A1 | | 7/2006 | Fujita et al. |
| 2008/0111516 | A1 | * | 5/2008 | Inokuma ..................... 318/799 |

FOREIGN PATENT DOCUMENTS

KR 1999-85924 12/1999

KR 10-2006-0071895 6/2006

OTHER PUBLICATIONS

H. Sugimoto et al., "Fact of the Theory and Design for AC Servo-System", pp. 142-149 (1990).
English language translation of H. Sugimoto et al., "Fact of the Theory and Design for AC Servo-System", pp. 142-149 (1990).
Office Action issued in Korean Application 10-2007-124972 on Jul. 29, 2009.
English Language Translation of Office Action issued in Korean Application 10-2007-124972 on Jul. 29, 2009.
English Language Abstract of KR Publication 1999-85924 published Dec. 15, 1999.

(Continued)

*Primary Examiner*—Bryan Bui
(74) *Attorney, Agent, or Firm*—DLA Piper LLP US (57) ABSTRACT

This disclosure concerns a velocity detector comprises a memory storing preset tentative angles and a trigonometric function value corresponding to each of the preset tentative angles; a first register storing a first coordinate (x1, y1) of a body; a second register storing a second actual coordinate (x2, y2) of the body; a first calculator calculating a first calculational coordinate represented by an addition or a subtraction between x1 and a result of shifting a figure of y1 based on the trigonometric function value; a second calculator calculating a second calculation coordinate represented by the addition or the subtraction between y2 and a result of shifting a figure of x2 based on the trigonometric function value, wherein the first and the second calculators calculate the first and second calculational coordinates respectively so that the first actual coordinate (x1, y1) and the second actual coordinate (x2, y2) are closer to each other.

18 Claims, 5 Drawing Sheets

OTHER PUBLICATIONS

English Language Abstract of JP 2006-201148 Published Aug. 3, 2006.

English Language Translation of Office Action issued in German Appl 10 2007 057 476 on Nov. 16, 2009.

Office Action issued in German Appl 10 2007 057 476 on Nov. 16, 2009.

Duprat J., Muller J.-M: The CORDIC Algorithm; New Results fur Faist VLSI huplementation. In: IEEE Transactions on Computers, vol. 42, No. 2, Feb 1993, S. 168-178.

* cited by examiner

| TARGET | PREVIOUS POSITION | DISCRIMINATION INEQUATION | ROTATIONAL DIRECTION TRUE | FALSE |
|---|---|---|---|---|
| I | I | - | CCW | CW |
| | II | $\lvert y2 \rvert > \lvert yc_{i-1} \rvert$ | CW | CW |
| | III | - | CW | CW |
| | IV | - | CW | CW |
| | V | - | CW | CW |
| | VI | - | CCW | CCW |
| | VII | - | CCW | CCW |
| | VIII | - | CCW | CCW |
| II | I | - | CW | CCW |
| | II | - | CW | CW |
| | III | $\lvert x2 \rvert > \lvert xc_{i-1} \rvert$ | CW | CW |
| | IV | - | CW | CW |
| | V | - | CW | CW |
| | VI | - | CW | CW |
| | VII | - | CCW | CCW |
| | VIII | - | CCW | CCW |
| III | I | - | CCW | CW |
| | II | - | CCW | CW |
| | III | - | CW | CW |
| | IV | $\lvert x2 \rvert > \lvert xc_{i-1} \rvert$ | CW | CW |
| | V | - | CW | CW |
| | VI | - | CW | CW |
| | VII | - | CW | CW |
| | VIII | - | CCW | CCW |
| IV | I | - | CW | CW |
| | II | - | CCW | CW |
| | III | - | CCW | CW |
| | IV | - | CW | CW |
| | V | $\lvert y2 \rvert > \lvert yc_{i-1} \rvert$ | CW | CW |
| | VI | - | CW | CW |
| | VII | - | CW | CW |
| | VIII | - | CW | CW |

FIG. 7B

| TARGET | PREVIOUS POSITION | DISCRIMINATION INEQUATION | ROTATIONAL DIRECTION TRUE | FALSE |
|---|---|---|---|---|
| V | I | - | CW | CW |
| | II | - | CW | CW |
| | III | - | CCW | CW |
| | IV | - | CCW | CW |
| | V | - | CW | CW |
| | VI | $\lvert y2 \rvert > \lvert yc_{i-1} \rvert$ | CCW | CW |
| | VII | - | CW | CW |
| | VIII | - | CW | CW |
| VI | I | - | CW | CW |
| | II | - | CW | CW |
| | III | - | CW | CW |
| | IV | - | CCW | CW |
| | V | - | CCW | CW |
| | VI | - | CW | CW |
| | VII | $\lvert x2 \rvert > \lvert xc_{i-1} \rvert$ | CW | CCW |
| | VIII | - | CW | CW |
| VII | I | - | CW | CW |
| | II | - | CW | CW |
| | III | - | CW | CW |
| | IV | - | CW | CW |
| | V | - | CCW | CW |
| | VI | - | CCW | CW |
| | VII | - | CW | CW |
| | VIII | $\lvert x2 \rvert > \lvert xc_{i-1} \rvert$ | CCW | CW |
| VIII | I | - | CW | CCW |
| | II | - | CW | CW |
| | III | - | CW | CW |
| | IV | - | CW | CW |
| | V | - | CW | CW |
| | VI | - | CCW | CW |
| | VII | - | CCW | CW |
| | VIII | $\lvert y2 \rvert > \lvert yc_{i-1} \rvert$ | CW | CCW |

VELOCITY DETECTION APPARATUS

CROSS-REFERENCE TO RELATED APPLICATION

This application is based upon and claims the benefit of priority from the prior Japanese Patent Application No. 2006-328311, filed on Dec. 5, 2006, the entire contents of which are incorporated herein by reference.

BACKGROUND OF THE INVENTION

1. Field of the Invention

The present invention relates to a velocity detector.

2. Related Art

In a motion control of a servo motor, an SIN signal and a COS signal are generated based on a movement distance of a machine or a movement angle of a shaft of the machine in a position detector. An arithmetic circuit of the position detector samples SIN signals and COS signals at intervals of a unit time, and calculates a moving velocity or an angular velocity from a distance difference or an angle difference between two samples and a time interval between two sampling operations.

For example, if coordinates obtained by the two sampling operations are (x1, y1) and (x2, y2) and a sampling time interval is t (sec), an angular velocity ω (rad/sec) can be expressed by the following Equation 0.

$$\omega = (\theta 2 - \theta 1)/t = (\tan^{-1}(y2/x2) - \tan^{-1}(y1/x1))/t \quad \text{(Eq. 0)}$$

In the Equation 1, θ1 (rad) and θ2 (rad) are absolute angles (declinations) at two sampling time points, respectively. As shown in the Equation 1, it is necessary to calculate the declinations from the coordinates so as to obtain the angular velocity ω.

To deal with the problem, use of a CPU or a custom LSI (Large-Scale Integrated Circuit) as the arithmetic circuit is proposed to realize the calculation of the Equation 1 using a digital logic circuit.

To calculate an arctangent ($\tan^{-1}$), it is necessary to do a division of sin/cos. However, two problems occur to calculation of the arctangent as follows. First, if a COS signal on a unit circle nears zero, an absolute value of a tangent (sin/cos) becomes quite greater. This results in a considerable increase in an error in the calculation result of the arctangent.

Second, it is necessary to do a division (sin/cos) so as to calculate the arctangent and the tangent. A divider is a circuit difficult to realize by a digital circuit. To realize the divider by a digital circuit, it is necessary to employ a digital circuit in far larger scale than an adder or a subtracter.

To realize a multiplier by a digital circuit, it is necessary to employ a digital circuit in far larger scale than the adder or the subtracter.

It is an object of the present invention to provide a velocity detection apparatus capable of highly accurately detecting a velocity of a moving body using a small-scale arithmetic circuit.

SUMMARY OF THE INVENTION

A velocity detection apparatus according to an embodiment of the present invention for regularly sampling a coordinate indicating a position of a moving body making a rotational motion or a reciprocating motion, and detecting an angular velocity of the moving body based on the coordinate, the apparatus comprises a memory storing a plurality of preset tentative angles and a trigonometric function value corresponding to each of the preset tentative angles; a first register storing a first actual coordinate (x1, y1) of the moving body obtained by a first sampling; a second register storing a second actual coordinate (x2, y2) of the moving body obtained by a second sampling next to the first sampling; a first calculator calculating a first calculational coordinate represented by an addition or a subtraction between x1 and a value obtained as a result of shifting a figure of y1 based on the trigonometric function value; a second calculator calculating a second calculation coordinate represented by the addition or the subtraction between y2 and a value obtained as a result of shifting a figure of x2 based on the trigonometric function value; and a third calculator adding up the tentative angles used in a calculation of the first or the second calculator, wherein the first and the second calculators calculate the first and the second calculational coordinates respectively so that the first actual coordinate (x1, y1) and the second actual coordinate (x2, y2) are closer to each other.

A velocity detection apparatus according to an embodiment of the present invention for regularly sampling a coordinate indicating a position of a moving body making a rotational motion or a reciprocating motion, and detecting an angular velocity of the moving body based on the coordinate, the apparatus comprises a memory storing a plurality of preset tentative angles $\Phi_i$, where $\Phi_0 > \Phi_1 > \Phi_2 > \ldots > \Phi_i > \ldots \Phi_n$, i=0, 1, 2, ..., n, and n is a natural number, a trigonometric function value tan $\Phi_i$ corresponding to each of the preset tentative angles; a first register storing a first actual coordinate (x1, y1) of the moving body obtained by a first sampling; a second register storing a second actual coordinate (x2, y2) of the moving body obtained by a second sampling next to the first sampling; a first calculator calculating a following Equations 1 or 2 based on the first actual coordinate (x1, y1) and the trigonometric function value tan $\Phi_i$ $$\left. \begin{array}{l} xxc_i = xxc_{i-1} - yyc_{i-1} * \tan\Phi_i \\ yyc_i = yyc_{i-1} + xxc_{i-1} * \tan\Phi_i \end{array} \right\} \quad \text{(Equations 1)}$$

$$\left. \begin{array}{l} xxc_i = xxc_{i-1} + yyc_{i-1} * \tan\Phi_i \\ yyc_i = yyc_{i-1} - xxc_{i-1} * \tan\Phi_i \end{array} \right\} ; \quad \text{(Equatoins 2)}$$

a second calculator calculating the Equation 1 or 2 based on the second actual coordinate (x2, y2) and the trigonometric function value tan $\Phi_i$; and a third calculator adding up the tentative angles tan $\Phi_i$ used in a calculation of the first or the second calculator, wherein $\Phi_i = \tan^{-1} 2^{-i}$ (i=0, 1, 2, ..., n), if i=0, then $xxc_{i-1} = x1$ and $yyc_{i-1} = y1$, for the first calculator, and $xxc_{i-1} = x2$ and $yyc_{i-1} = y2$ for the first calculator, each of the first and the second calculators calculate the Equations 1 or 2 in an order of i=0, 1, 2, ..., n, and the third calculator adds up the tentative angles for every i.

BRIEF DESCRIPTION OF THE DRAWINGS

FIG. 6 is a flowchart showing a processing for discriminating which of areas I to VIII shown in FIG. 5 a certain coordinate (x, y) belongs to.

DETAILED DESCRIPTION OF THE INVENTION

Embodiments of the present invention will be explained below in detail with reference to the accompanying drawings. Note that the invention is not limited thereto.

Figure 1:
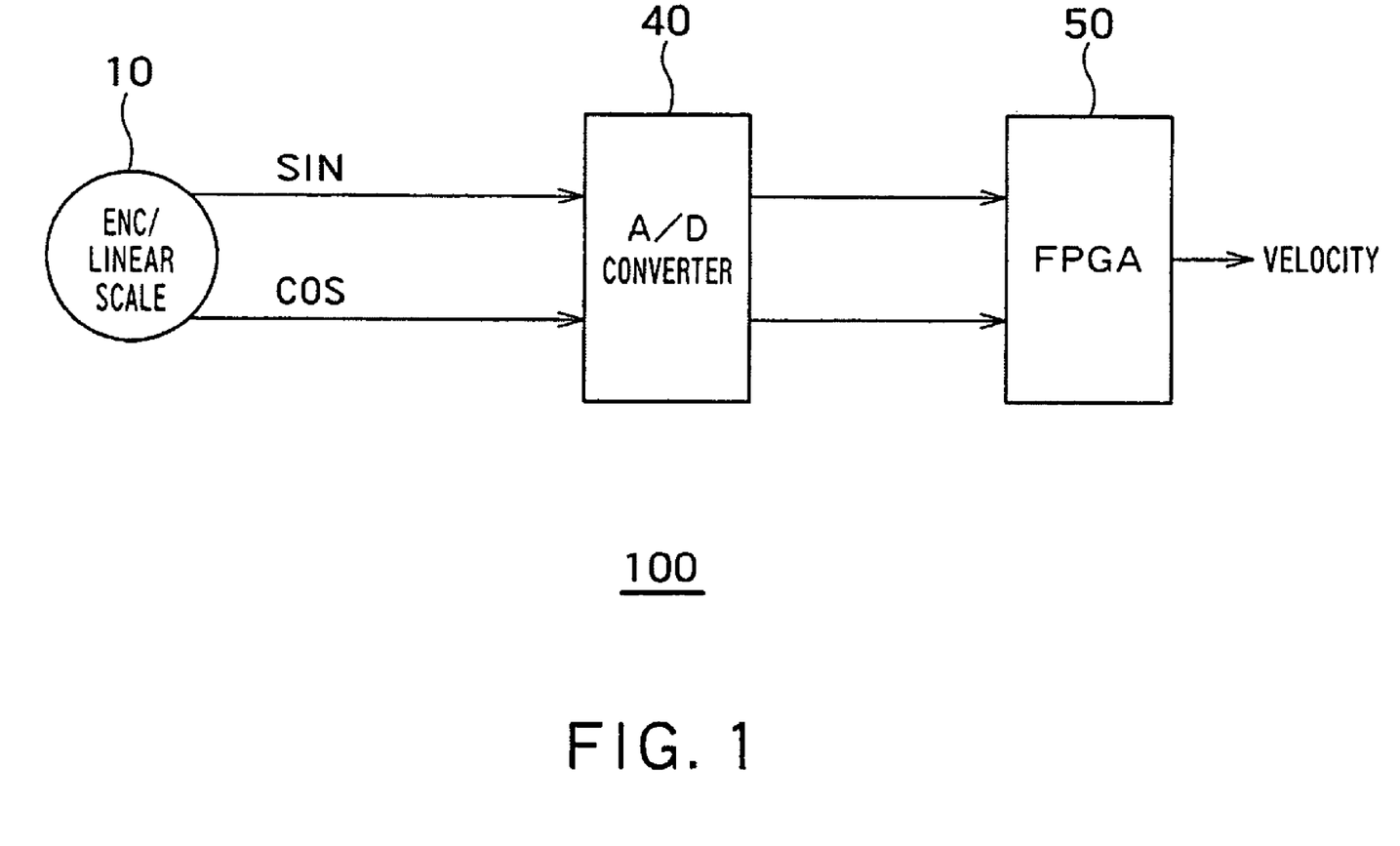
FIG. 1 is a block diagram of a velocity detection apparatus 100 according to an embodiment of the present invention.

FIG. 1 is a block diagram of a velocity detection apparatus 100 according to an embodiment of the present invention. The velocity detection apparatus 100 includes a rotary encoder or a linear scale 10, an A/D converter 40, and a calculating unit 50. The calculating unit 50 is a general-purpose CPU or a custom LSI. The calculating unit 50 can be constituted by, for example, an FPGA (Field Programmable Gate Array). The velocity detection apparatus 100 can be arranged in, for example, a servo motor including a moving body making a rotational motion or a reciprocating motion. The moving body is, for example, a rotor of the servo motor arranged in a machine tool or an arm making a reciprocating motion. The velocity detection apparatus 100 can be arranged in, for example, a positioning apparatus using the rotary encoder or linear scale 10.

The rotary encoder or linear scale 10 outputs a signal of a coordinate (sin, cos) indicating a position of a moving body making a rotational motion or a reciprocating motion. This coordinate (sin, cos) is a value of a sinusoidal wave having an orthogonal phase. The A/D converter 40 converts the SIN signal and the COS signal from the rotary encoder or linear scale 10 into digital signals. The calculating unit 50 receives the digital signals based on the SIN signal and the COS signal, respectively from the A/D converter 40, and calculates an angular velocity or a velocity of the moving body.

While the FPGA can be used as the calculating unit 50, another arbitrary LSI can be used as the calculating unit 50 in place of the FPGA. If the calculating unit 50 is realized as a logic circuit on the custom LSI, the calculating unit 50 can perform an iterative processing for repeating the same processing in a short time. Alternatively, the calculating unit 50 can be realized by a general-purpose CPU and software. If the calculating unit 50 is realized by a general-purpose CPU and software, the calculating unit 50 can perform various processes by changing programs.

Figure 2:
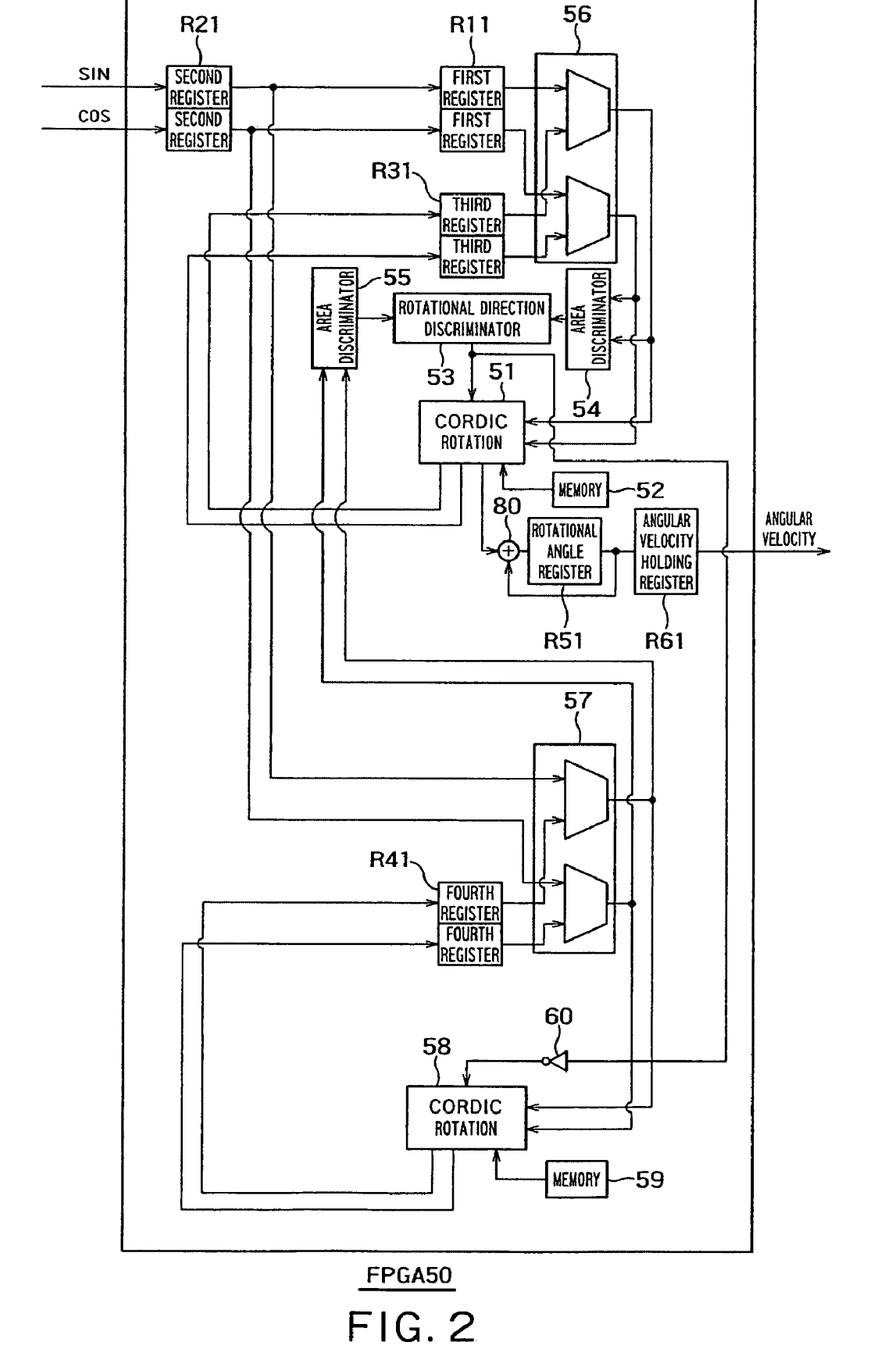
FIG. 2 is a block diagram showing an internal configuration of the calculating unit 50.

FIG. 2 is a block diagram showing an internal configuration of the calculating unit 50. The calculating unit 50 includes a CORDIC rotation (hereinafter, also "rotator") 51 serving as a first calculator, a CORDIC rotation 58 serving as a second calculator, memories 52 and 59, a rotational direction discriminator 53, area discriminators 54 and 55, selectors 56 and 57, first to fourth registers R11, R21, R31, and R41, a rotational angle register R51 serving as a fifth register, an angular velocity holding register R61, and an adder 80 serving as a third calculator.

Figure 3:
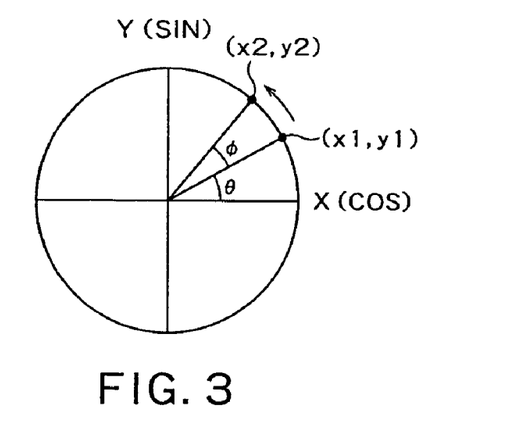
FIG. 3 is a chart showing a positional relationship between a first actual coordinate (sin θ, cos θ) and a second actual coordinate (sin(θ+Φ), cos(θ+Φ))

FIG. 3 is a chart showing a positional relationship between a first actual coordinate (sin θ, cos θ) and a second actual coordinate (sin(θ+Φ), cos(θ+Φ)). The second actual coordinate (sin(θ+Φ), cos(θ+Φ)) is an actual coordinate when the moving body (e.g., rotor) rotates by Φ from the first actual coordinate (sin θ, cos θ) as shown in FIG. 3. In a space of FIG. 3, the rotor rotates in a CCW (counterclockwise) direction (an arrow direction in FIG. 3). It is to be noted that units of θ and Φ are radians.

With reference to FIGS. 2 and 3, a process for calculating an angular velocity of the rotor when the rotor rotates from the first actual coordinate to the second actual coordinate based on the SIN signal and the COS signal will be described. Since the velocity of the moving body making a reciprocating motion can be simply calculated from the angular velocity, only the calculation of the angular velocity will be described herein.

In the present embodiment, a CORDIC (COordinate Rotation Digital Computer) algorithm is used to calculate the angular velocity. The CORDIC algorithm has a vectoring mode and a rotation mode. In the embodiment, the rotation mode is used, and the CORDIC algorithm is included in the calculating unit 50 and realized by a logic circuit.

To facilitate understanding, it is assumed that the rotary encoder 10 outputs a sinusoidal wave and a cosine wave in one cycle when the rotor serving as the moving body rotates once. The velocity detection apparatus 100 samples the coordinate of the rotor periodically (at intervals of periods T) in one cycle. The velocity detection apparatus 100 acquires a two-dimensional coordinate (Euclidean coordinate) (x1, y1) of the rotor by a first sampling, and acquires a two-dimensional coordinate (x2, y2) by a second sampling time after the first sampling. Values x1 and x2 are SIN values and y1 and y2 are COS values. The velocity detection apparatus 100 calculates the angle Φ from the position of the rotor at the first sampling time to that at the second sampling time based on the coordinates (x1, y1) and (x2, y2) using the CORDIC algorithm. Since sampling is performed at predetermined intervals, the angular velocity of the rotor can be obtained if the angle Φ is calculated.

The memory 52 stores therein a plurality of preset tentative angles $\Phi_0$ to $\Phi_n$ ($\Phi_0 > \Phi_1 > \Phi_2 > \ldots \Phi_n$) (where n is a natural number) and trigonometric function values $\tan \Phi_0$ to $\tan \Phi_n$ corresponding to the respective tentative angles. In an initial state of the velocity detection apparatus 100, no specific values are stored in the first to fourth registers R11, R21, R31, and R41. The fifth register R51 is set to zero. The fifth register R51 is reset to zero at every sampling.

First, the calculating unit 50 receives the first actual coordinate (x1, y1)=(sin θ, cos θ) obtained by the first sampling from the A/D converter 40 as digital values. The first coordinate is stored in the second register R21.

In the initial state, the first, third, and fourth registers R11, R31, and R41 are unstable. Since calculated values at this time are based on unstable values, they are ruled out.

Next, the calculating unit 50 performs the second sampling in a next period. The calculating unit 50 receives the second actual coordinate (x2, y2)=(sin(θ+Φ), cos(θ+Φ)) of the rotor obtained by the second sampling from the A/D converter 40 as digital values. At this time, the first actual coordinate (sin θ, cos θ) is moved to the first register R11, and the second actual coordinate (sin(θ+Φ), cos(θ+Φ)) is stored in the second register R21.

The third register R31 is still unstable when the calculating unit 50 receives the second actual coordinate (sin(θ+Φ), cos(θ+Φ)). Due to this, the selector 56 selects the first register R11 to move the first actual coordinate (sin θ, cos θ) to the area discriminator 54 and the rotator 51. Further, the fourth register R41 is still unstable at this time. Due to this, the selector 57 selects the second register R21 to move the second actual coordinate (sin(θ+Φ), cos(θ+Φ)) to the area discriminator 55 and the rotator 58.

The rotator 51 calculates a first calculational coordinate $(xxc_1, yyc_1)$ using the first coordinate (x1, y1)=(sin θ, cos θ) and the trigonometric function value tan $\Phi_0$ from the memory 52. The rotator 58 calculates a second calculational coordinate $(xxc_1, yyc_1)$ using the second coordinate (x2, y2)=(sin (θ+Φ), cos(θ+Φ)) and the trigonometric function value tan $\Phi_0$ from the memory 59. Specific calculation contents of the rotators 51 and 58 will be described later. Since the rotators 51 and 58 calculate the Equations 1 and 2 described later, the first and second calculational coordinates are expressed by $(xxc_i, yyc_i)$, respectively. However, it is to be noted that the first calculational coordinate differs from the second calculational coordinate. Symbol i is equal to the number of calculations already made by each of the rotators 51 and 58.

The third register R31 stores the first calculational coordinate $(xxc_1, yyc_1)$. The fourth register R41 stores the second calculational coordinate $(xxc_1, yyc_1)$. Thereafter, the selectors 56 and 57 select the third and fourth registers R31 and R41, respectively until the sampling operation is performed in the next period. The rotators 51 and 58 repeat similar calculations using the coordinates stored in the third and fourth registers R31 and R41 and the trigonometric function value tan $\Phi_1$, respectively. Calculation results of the rotators 51 and 58 are overwritten to the third and fourth registers R31 and R41 as the first calculational coordinate $(xxc_i, yyc_i)$ and the second calculational coordinate $(xxc_i, yyc_i)$, respectively. In this manner, the rotators 51 and 58 calculate the first calculational coordinate and the second calculational coordinate, respectively, while sequentially using the trigonometric function values tan $\Phi_0$, tan $\Phi_1$, tan $\Phi_2$, . . . , tan $\Phi_i$. In the respective calculations corresponding to i=0, 1, 2, . . . , the rotators 51 and 58 calculate the first calculational coordinate and the second calculational coordinate so as to make them closer to each other. By doing so, the first calculational coordinate and the second calculational coordinate converge into an intermediate coordinate (sin(θ+Φ/2), cos(θ+Φ/2)) between the first and second actual coordinates whenever the rotators 51 and 58 make calculations. The intermediate coordinate is decided for every sampling and transmitted to the rotational angle register R51. Data stored in the rotational angle register R51 is updated for every sampling.

The adder 80 adds a tentative angle $+\Phi_i$ or $-\Phi_i$ to a tentative angle $+\Phi_{i-1}$ or $-\Phi_{i-1}$ stored in the rotational angle holding register R51, and returns the addition result to the rotational angle register R41. In this way, the adder 80 adds up tentative angles $+\Phi_0$ or $-\Phi_0$, $+\Phi_1$ or $-\Phi_1$, $+\Phi_2$ or $-\Phi_2$, . . . , $+\Phi_n$ or $-\Phi_n$, and the rotational angle holding register R51 holds the added tentative angle. When the tentative angle $\Phi_I$ converges, the angle stored in the rotational angle holding register R51 is equal to a rotational angle Φ/2 of the rotor from the first actual coordinate to the intermediate coordinate. The rotational angle stored in the rotational angle holding register R51 is updated for every sampling. The "addition" means herein calculation by repeating addition or subtraction with respect to a previous calculation result. For example, the added tentative angle can be expressed as $\Phi_0-\Phi_1+\Phi_2-\Phi_3+\ldots$.

The actual rotational angle of the rotor can be obtained by doubling the data stored in the rotational angle register R51. To double the data, it suffices to shift a digital value by one bit leftward. "To shift leftward" means to shift a figure of a certain numeric value in a direction in which the value becomes a greater value. Accordingly, there is no need to use a multiplier for the calculation at this time. This calculation can be made by any one of the rotational angle register R51, the angular velocity holding register R61 or an external circuit exteriorly of the calculating unit 50.

Since a sampling period for sampling actual coordinates is fixed, the value of the rotational angle Φ of the rotor can be used as a relative angular velocity as it is. If the sampling period for sampling actual coordinates is set as a unit time, the value of the rotational angle Φ of the rotor can be used as an absolute angular velocity as it is. The angular velocity is stored in the angular velocity holding register R61 and output if it is necessary to do so. The angular velocity stored in the angular velocity holding register R61 is updated for every sampling.

Alternatively, the adder 80 can acquire the intermediate coordinate (sin(θ+Φ/2), cos(θ+Φ/2)) from the rotator 58. This is because the first calculational coordinate and the second calculational coordinate converge into the same intermediate coordinate.

The area discriminator 54 discriminates whether the area is the area to which the first actual coordinate stored in the first register R11 belongs or the area to which the first actual coordinate stored in the third register R31 belongs. Namely, the area discriminator 54 discriminates the area to which the coordinate selected by the selector 56 belongs. The area discriminator 55 discriminates whether the area is the area to which the second actual coordinate stored in the second register R21 belongs or the area to which the second actual coordinate stored in the fourth register R41 belongs. Namely, the area discriminator 55 discriminates the area to which the coordinate selected by the selector 57 belongs.

The specific calculation contents of the rotators 51 and 58 will next be described. The first and second calculational coordinates $(xxc_i, yyc_i)$ can be expressed by the following Equations 1 and 2, respectively. The comparator 53 selects one of the Equations 1 and 2 based on discrimination results of the discriminators 54 and 55. The rotators 51 and 58 execute calculations of the Equations 1 and 2 based on a comparison result of the comparator 53, respectively. The rotator 58 receives an inverted signal with respect to the comparison result of the comparator 53 via an inverter 60. Accordingly, the rotator 58 makes a calculation so as to move the second actual coordinate or the second calculational coordinate in a direction opposite to a moving direction of the first actual coordinate or the first calculational coordinate.

$$\left.\begin{array}{l} xxc_i = xxc_{i-1} - yyc_{i-1} * \tan\Phi_i \\ yyc_i = yyc_{i-1} + xxc_{i-1} * \tan\Phi_i \end{array}\right\} \quad \text{(Eq. 1)}$$

or $$\left.\begin{array}{l} xxc_i = xxc_{i-1} + yyc_{i-1} * \tan\Phi_i \\ yyc_i = yyc_{i-1} - xxc_{i-1} * \tan\Phi_i \end{array}\right\} \quad \text{(Eq. 2)}$$

In the Equations 1 and 2, tan $\Phi_i = 2^{-i}$ (i=0, 1, 2, . . . , n). If i=0, the first actual coordinate that is an initial value to be given to the rotator 51 is $xxc_{i-1}=x1$ and $yyc_{i-1}=y1$. The second actual coordinate that is an initial value to be given to the rotator 58 is $xxc_{i-1}=x2$ and $yyc_{i-1}=y2$.

The Equations 1 and 2 will be described. First, the first actual coordinate and the second actual coordinate can be expressed by the following Equations 3 to 6.

$$x(i-1) = \cos\theta \quad \text{(Eq. 3)}$$

$$y(i-1) = \sin\theta \quad \text{(Eq. 4)}$$

$$x(i) = \cos(\theta+\phi) \quad \text{(Eq. 5)}$$

$$y(i) = \sin(\theta+\phi) \quad \text{(Eq. 6)}$$

The Equations 5 and 6 are transformed into the following Equations 7 and 8, respectively using the addition theorem of the trigonometric function.

$$x(i) = \cos\theta \cdot \cos\phi - \sin\theta \cdot \sin\phi \quad (\text{Eq. 7})$$

$$y(i) = \sin\theta \cdot \cos\phi + \cos\theta \cdot \sin\phi \quad (\text{Eq. 8})$$

By assigning the Equations 3 and 4 to the Equations 7 and 8 to transform the Equations 3 and 4, the following Equations 9 and 12 are obtained, respectively.

$$x(i)/\cos\phi = x(i-1) - y(i-1) \cdot \tan\phi \quad (\text{Eq. 9})$$

$$y(i)/\cos\phi = y(i-1) + x(i-1) \cdot \tan\phi \quad (\text{Eq. 10})$$

If it is assumed that $x(i)/\cos\Phi$ is replaced by $xxc(i)$ and $y(i)/\cos\Phi$ is replaced by $yyc(i)$, the Equations 9 and 10 can be expressed as the following Equations 9' and 10', respectively.

$$xxc(i) = x(i-1) - y(i-1) \cdot \tan\phi \quad (\text{Eq. 9'})$$

$$yyc(i) = y(i-1) + x(i-1) \cdot \tan\phi \quad (\text{Eq. 10'})$$

At this moment, the CORDIC algorithm is used. More specifically, the value of tan$\phi$ is limited to $+2^{-i}$ or $-2^{-i}$ as shown in the Equation 11. The tan $\Phi$ limited in this way will be denoted by "tan $\Phi i$".

$$\tan\phi i = \pm 2^{-i} = \pm 1, \pm 2^{-1}, \pm 2^{-2}, \ldots (i=0, 1, 2, \ldots n) \quad (\text{Eq. 11})$$

In this case, the possible value of $\Phi i$ is limited as shown in the Equation 12. This angle $\Phi i$ is a discrete numeric value and "tentative angle".

$$\phi i = \tan^{-1}(\pm 2^{-i}) = \pm 0.78 \text{ rad}, \pm 0.46 \text{ rad}, \pm 0.25 \text{ rad}, \pm 0.12 \text{ rad} \quad (\text{Eq. 12})$$

By assigning the trigonometric function value tan $\Phi i$ to the Equations 9 and 10, the calculational coordinate can be obtained. Initial values (i=0) of the respective rotators 51 and 58 are the first actual coordinate (x1, y1) stored in the first register R11 and the second actual coordinate (x2, y2) stored in the second register R21 shown in FIG. 2, respectively. Namely, the initial values of the rotators 51 and 58 are (xxc(0), xxc(0))=(x1, y1) and (xxc(0), xxc(0))=(x2, y2), respectively. The first and second actual coordinates are known by the first and second sampling operations.

(First Calculation (i=0))

The rotator 51 first executes a calculation in which the first actual coordinate (x1, y1) is assigned to each of the Equations 9 and 10 as an initial value. Namely, the rotator 51 executes calculations of the following Equations 13 and 14. At this time, the selector 56 selects the first register R11.

$$xxc1 = x1 - y1 \cdot \tan\phi 0 \quad (\text{Eq. 13})$$

$$yyc1 = y1 + x1 \cdot \tan\phi 0 \quad (\text{Eq. 14})$$

As shown in the Equation 11, $\tan\Phi i = +2^{-i}$ or $-2^{-i}$. Accordingly, it suffices that the rotator 51 simply shifts figures of y1 and x1 expressed as digital values (binary values) based on the trigonometric function value $\tan\Phi i = +2^{-i}$ or $-2^{-i}$ for multiplication terms (y1·tan $\Phi 0$) and (x1·tan $\Phi 0$) included in the respective Equations 13 and 14. In other words, there is no need for the rotator 51 to actually do a multiplication. This can dispense with including a multiplier in the rotator 51. However, because of tan $\Phi 0=1$, the rotator 51 does not shift the figures of y1 and x1 in the first calculation indicated by the Equations 13 and 14. Thereafter, the rotator 51 does an addition or a subtraction between x1 or y1 and the resultant value of each of the multiplication terms. The rotator 51 can thereby calculate the Equations 13 and 14 without doing a multiplication.

Meanwhile, the rotator 58 first executes a calculation in which the second actual coordinate (x2, y2) is assigned to each of the Equations 9 and 10 as an initial value. Namely, the rotator 58 executes calculations of the following Equations 15 and 16. At this time, the selector 57 selects the second register R21.

$$xxc1 = x2 + y2 \cdot \tan\phi 0 \quad (\text{Eq. 15})$$

$$yyc1 = y2 - x2 \cdot \tan\phi 0 \quad (\text{Eq. 16})$$

Similarly to the rotator 51, there is no need for the rotator 58 to make a multiplication to calculate multiplication terms (y2·tan $\Phi 0$) and (x2·tan $\Phi 0$) included in the respective Equations 15 and 16. It suffices that the rotator 58 simply shifts figures of y2 and x2 expressed as digital values (binary values). This can dispense with including a multiplier in the rotator 58. However, because of tan $\Phi 0=1$, the rotator 58 does not shift the figures of y1 and x1 in the first calculation indicated by the Equations 15 and 16. Thereafter, the rotator 58 does an addition or a subtraction between x2 or y2 and the resultant value of each of the multiplication terms. The rotator 58 can thereby calculate the Equations 15 and 16 without doing a multiplication.

(Second and Following Calculations (i=1, . . . ))

In the second and the following calculations, the rotators 51 and 58 use the Equation 1 or 2.

The first calculational coordinate (xxc1, yyc1) calculated by the rotator 51 is stored in the third register R31. Thereafter, the selector 56 selects the third register R31 and transmits the first calculational coordinate (xxc1, yyc1) to the rotator 51. The rotator 51 repeats calculations by assigning the first calculational coordinate (xxc1, yyc1) to $xxc_{i-1}$ and $yyc_{i-1}$ in the Equation 1 or 2, respectively. The first calculational coordinate (xxc2, yyc2) is thereby obtained. The first calculational coordinate (xxc2, yyc2) is overwritten to the third register R31 in place (xxc1, yyc1). Namely, the rotator 51 calculates the Equations 13 and 14 in the first calculation, and repeatedly calculates the Equation 1 or 2 in the following calculations.

To calculate multiplication terms ($yyc_{i-1}$·tan $\Phi 0$) and ($xxc_{i-1}$·tan $\Phi 0$) included in the respective Equations 1 and 2, it suffices that the rotator 51 simply shifts figures of $yyc_{i-1}$ and $xxc_{i-1}$ expressed as digital values (binary values) based on the trigonometric function value tan $\Phi i = +2^{-i}$ or $-2^{-i}$. In the present embodiment, the rotator 51 shifts the figures of $yyc_{i-1}$ and $xxc_{i-1}$ by i rightward. "To shift rightward" means to shift a figure of a certain numeric value in a direction in which the value becomes a smaller value. Accordingly, there is no need for the rotator 51 to actually do a multiplication for the Equations 1 and 2. Thereafter, the rotator 51 does an addition or a subtraction between $xxc_{i-1}$ or $yyc_{i-1}$ and the resultant value of each of the multiplication terms. The rotator 51 can thereby calculate the Equations 1 and 2 without doing a multiplication. Since the value i increases by one for every calculation, a shift amount of the multiplication term increases for every calculation. The calculational coordinate ($xxc_i$, $yyc_i$) thereby converges in every calculation. The tentative angle $\Phi i$ used in the calculation is added to the rotational angle register R51 for every calculation.

Moreover, the second calculational coordinate (xxc1, yyc1) calculated by the rotator 58 is stored in the fourth register R41. Thereafter, the selector 57 selects the fourth register R41 and transmits the second calculational coordinate (xxc1, yyc1) to the rotator 58. The rotator 58 repeats calculations by assigning the second calculational coordinate (xxc1, yyc1) to xxi−1 and yyi−1 in the Equation 1 or 2, respectively. The second calculational coordinate (xxc2, yyc2) is thereby obtained. Namely, the rotator 58 calculates the Equations 15 and 16 in the first calculation, and repeatedly calculates the Equation 1 or 2 in the following calculations.

Similarly to the rotator 51, there is no need for the rotator 58 to make a multiplication for the Equations 1 and 2. Thereafter, the rotator 58 does an addition or a subtraction between $xxc_{i-1}$ or $yyc_{i-1}$ and the resultant value of each of the multiplication terms. The rotator 58 can thereby calculate the Equations 1 and 2 without doing a multiplication.

The reason for replacing x(i)/cos $\Phi$ by xxc(i) and y(i)/cos $\Phi$ by yyc(i) in the Equations 9 and 10 is to exclude a multiplication of cost from the calculation. By so replacing, it is substantially unnecessary for the rotator to do a multiplication. It is to b noted that the result (xxc1, yyc2) obtained as the calculational coordinate is a value obtained by dividing the coordinate by cos $\Phi$. This is only the calculational result in the course of the calculation and allowable as long as the angle $\Phi/2$ is eventually obtained.

The rotators 51 and 58 simultaneously perform calculation operations to reduce the operation time. Signs + and − in the Equations 13 to 16 are often set opposite.

The discrete numeric value for every i in the Equations 11 and 12 is set in advance and stored in the memories 52 and 59. Namely, the memories 52 and 59 store the tentative angle $\Phi i$ and the trigonometric function value tan $\Phi i$ corresponding to the tentative angle $\Phi i$ for every i.

Each of the rotators 51 and 58 acquires the numeric value stored in each of the memories 52 and 59 and expressed by the Equation 11. The rotators 51 and 58 calculate the first and second calculational coordinates ($xxc_i$, $yyc_i$), respectively expressed by the Equation 1 or 2 for every i in order of i=0, 1, 2, . . . .

The Equation 1 is an equation if the tentative angle $\Phi i$ is positive whereas the Equation 2 is an equation if the tentative angle $\Phi i$ is negative. The tentative angle $\Phi i$ in the Equations 1 and 2 is represented as the absolute value. That is, the Equation 2 is an equation obtained by assigning −$\Phi i$ to the tentative angle $\Phi i$ in the Equation 1. If the tentative angle $\Phi i$ is positive (+$\Phi i$), the rotators 51 and 59 move the respective calculational coordinates in a counterclockwise (CCW) direction shown in FIG. 4. If the tentative angle $\Phi i$ is negative (−$\Phi i$), the rotators 51 and 59 move the respective calculational coordinates in a clockwise (CW) direction shown in FIG. 4. Each of the rotators 51 and 58 selects one of the Equations 1 and 2 according to the signal transmitted from the rotational direction discriminator 53.

The rotators 51 and 58 alternately or complementarily calculate the Equations 1 and 2 in the order of i=0, 1, 2, . . . so that the first and second calculational coordinate are closer to each other. Namely, when the rotator 51 calculates the Equation 1, the rotator 58 calculates the Equation 2. When the rotator 51 calculates the Equation 2, the rotator 58 calculates the Equation 1. If one of the moving direction of the first calculational coordinate and that of the second calculational coordinate is decided, the other is decided accordingly. It, therefore, suffices to provide one rotational direction discriminator 53.

Figure 4:
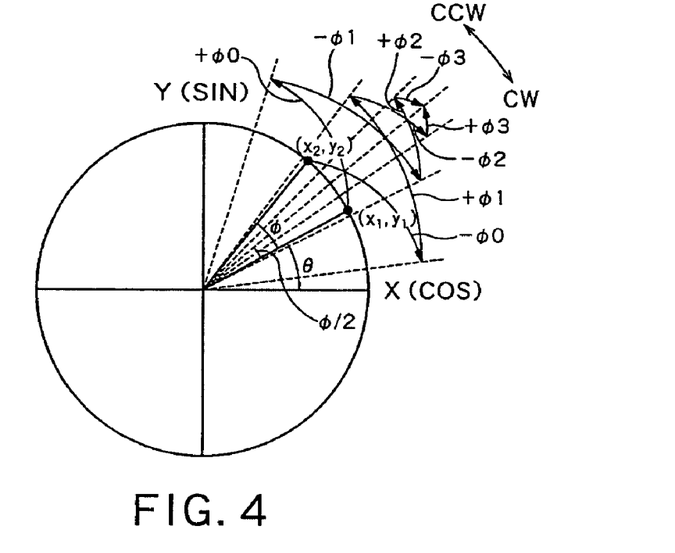
FIG. 4 is a conceptual diagram of the first calculational coordinate and the second calculational coordinate converging into the intermediate coordinate between the first actual coordinate (x1, y1) and the second actual coordinate (x2, y2)

As expressed in the Equation 12, the tentative angle $\Phi i$ is smaller if i is greater. Due to this, as shown in FIG. 4, the first calculational coordinate and the second calculational coordinate can converge into the intermediate coordinate between the first actual coordinate (x1, y1) and the second actual coordinate (x2, y2). The rotators 51 and 58 calculate the Equations 1 and 2 so that the first and second calculational coordinate are closer to each other. Due to this, the tentative angle $\Phi i$ becomes half of the actual rotational angle ($\Phi/2$) as a result of convergence. The addition of the tentative angle +$\Phi i$ or −$\Phi i$ is done by causing the adder 80 to add up calculation results of the rotator 51 stored in the register R51 for the respective calculations made by the rotator 51. Likewise, the addition of the tentative angle +$\Phi i$ or −$\Phi i$ can be done by causing the adder 80 to add up calculation results of the rotator 58 for the respective calculations made by the rotator 58.

With reference to FIG. 4, an operation performed by the calculating unit 50 will be described conceptually. First, the rotator 51 rotates the first actual coordinate (x1, y1) by $\Phi 0$ in the CCW direction. Actually, the rotator 51 calculates the Equations 13 and 14, thereby calculating the first calculational coordinate (xxc1, yyc1). The CCW is a direction from the first actual coordinate (x1, y1) to the second actual coordinate (x2, y2).

At the same time, the rotator 58 rotates the second actual coordinate (x2, y2) by $\Phi 0$ in the CW direction. Actually, the rotator 58 calculates the Equations 15 and 16, thereby calculating the second calculational coordinate (xxc1, yyc1), respectively. The CW is a direction from the second actual coordinate (x2, y2) to the first actual coordinate (x1, y1). As a result, the rotators 51 and 58 calculate the relevant equations to rotate the first actual coordinate and the second actual coordinate, respectively in a direction in which the first actual coordinate and the second actual coordinate are closer to each other (in a direction in which they face each other).

Next, the rotator 51 rotates the first calculational coordinate (xxc1, yyc1) by $\Phi 1$ in the CW direction. Actually, the rotator 51 calculates the Equation 2 (i=1), thereby recalculating the first calculational coordinate.

At the same time, the rotator 58 rotates the second calculational coordinate (xxc2, yyc2) by $\Phi 1$ in the CCW direction. Actually, the rotator 58 calculates the Equation 1 (i=1), thereby recalculating the second calculational coordinate.

Next, the rotator 51 rotates the first calculational coordinate (xxc1, yyc1) by $\Phi 1$ in the CW direction. Actually, the rotator 51 calculates the Equation 2 (i=1), thereby recalculating the first calculational coordinate (xxc1, yyc1). At the same time, the rotator 58 rotates the second calculational coordinate (xxc2, yyc2) by $\Phi 1$ in the CCW direction. Actually, the rotator 58 calculates the Equation 1 (i=1), thereby recalculating the second calculational coordinate (xxc2, yyc2).

Next, the rotator 51 rotates the first calculational coordinate (xxc1, yyc1) by $\Phi 2$ in the CCW direction. Actually, the rotator 51 calculates the Equation 2 (i=2), thereby recalculating the first calculational coordinate (xxc1, yyc1). At the same time, the rotator 58 rotates the second calculational coordinate (xxc2, yyc2) by $\Phi 2$ in the CW direction. Actually, the rotator 58 calculates the Equation 2 (i=2), thereby recalculating the second calculational coordinate (xxc2, yyc2).

As expressed in the Equation 12, the tentative angle $\Phi i$ is smaller if i is greater. Further, the rotators 51 and 58 calculate the relevant equations to rotate the first actual coordinate and the second actual coordinate, respectively in the direction in which the first actual coordinate and the second actual coordinate are closer to each other (in the direction in which they face each other). Due to this, the first calculational coordinate and the second calculational coordinate can converge into the intermediate coordinate (sin($\theta+\Phi/2$), cos($\theta+\Phi/2$)) whenever the rotators 51 and 58 repeat calculations. When the first calculational coordinate and the second calculational coordinate converge into the intermediate coordinate (sin($\theta+\Phi/2$), cos($\theta+\Phi/2$)), the tentative angle $\Phi i$ is almost equal to $\Phi/2$.

A method for causing the rotational direction discriminator 53 to select the direction CW or CCW (the Equation 1 or 2) will be described next.

Figure 5:
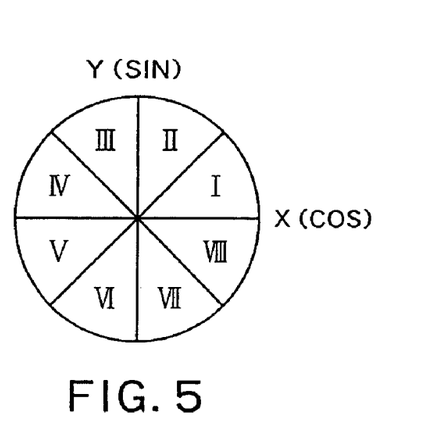
FIG. 5 is a charge showing eight areas that are divided areas of a coordinate system.
Figure 6:
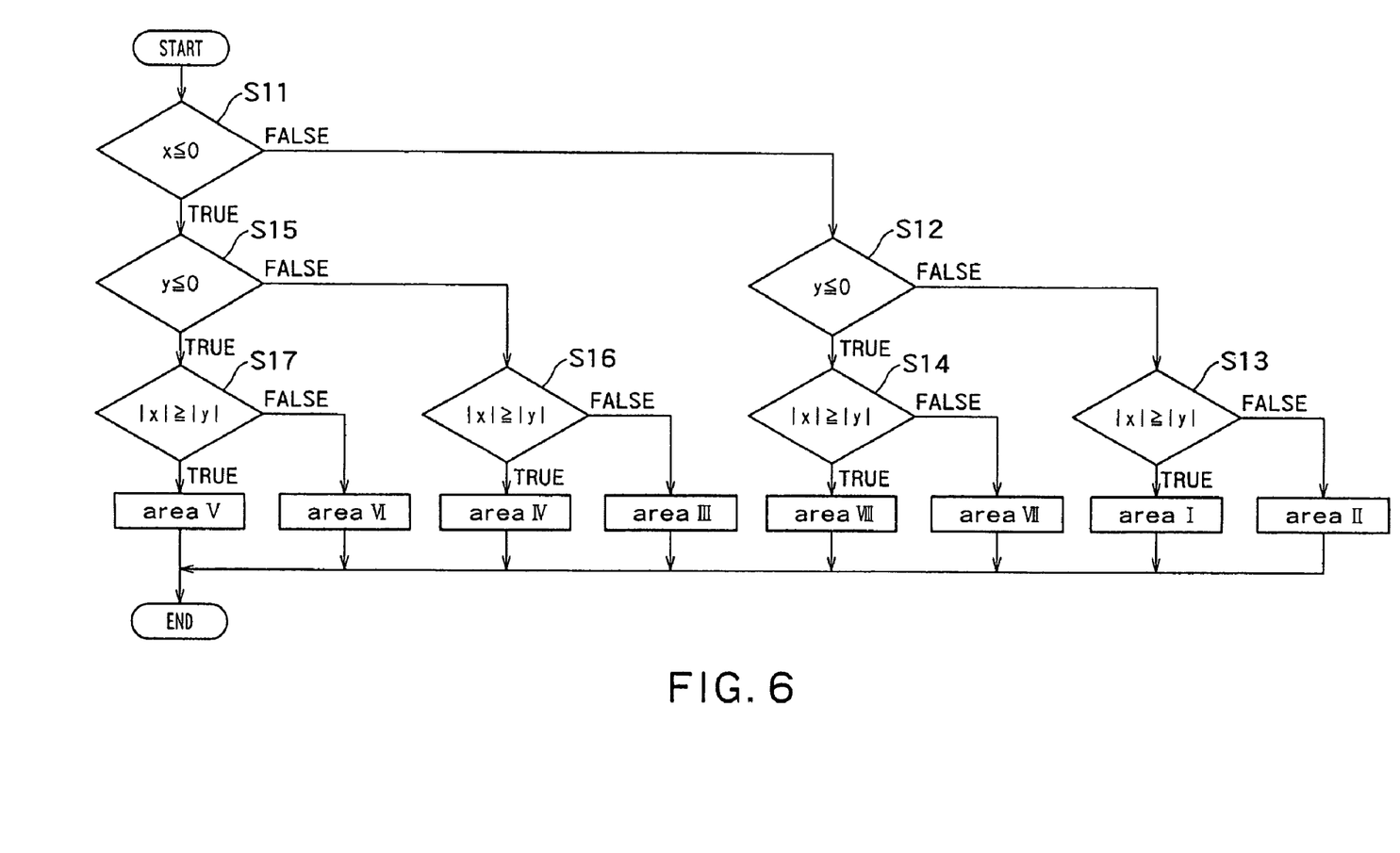

FIG. 5 is a charge showing eight areas that are divided areas of a coordinate system. FIG. 6 is a flowchart showing a processing for discriminating which of areas I to VIII shown in FIG. 5 a certain coordinate (x, y) belongs to. The discriminators 54 and 55 discriminate which of the areas I to VIII shown in FIG. 5 the first and second calculational coordinates belong to, respectively. To discriminate which of the areas I to VIII the first actual coordinate belongs to, the discriminator 54 can assign (x1, y1) to (x, y) shown in FIG. 6. To discriminate which of the areas I to VIII the second actual coordinate belongs to, the discriminator 55 can assign (x2, y2) to (x, y) shown in FIG. 6. To discriminate which of the areas I to VII the first or second calculational coordinate belongs to, the discriminator 54 or 55 can assign ($xxc_i$, $yyc_i$) to (x, y) shown in FIG. 6.

If it is determined that x>0 and y>0 at steps S11 and S12, respectively, the coordinate (x, y) belongs to the area I or II shown in FIG. 5. If it is determined that x≧y at a step S13, the coordinate (x, y) belongs to the area I. If it is determined that x≦y at the step S13, the coordinate (x, y) belongs to the area II.

If it is determined that x>0 and y≦0 at the steps S11 and S12, respectively, the coordinate (x, y) belongs to the area VII or VIII shown in FIG. 5. If it is determined that |x|≧|y| at a step S14, the coordinate (x, y) belongs to the area VIII. If it is determined that |x|<|y| at the step S14, the coordinate (x, y) belongs to the area VII.

If it is determined that x≦0 and y>0 at the steps S11 and S15, respectively, the coordinate (x, y) belongs to the area III or IV shown in FIG. 5. If it is determined that |x|≧|y| at a step S16, the coordinate (x, y) belongs to the area IV. If it is determined that |x|<|y| at the step S16, the coordinate (x, y) belongs to the area III.

If it is determined that x≦0 and y≦0 at the steps S11 and S15, respectively, the coordinate (x, y) belongs to the area V or VI shown in FIG. 5. If it is determined that |x|≧|y| at a step S17, the coordinate (x, y) belongs to the area V. If it is determined that |x|<|y| at the step S17, the coordinate (x, y) belongs to the area VI.

The area discriminators 54 and 55 can be constituted by a custom LSI such as an ASIC (Application Specific Integrated Circuit) to execute the flow shown in FIG. 6.

Figure 7A:
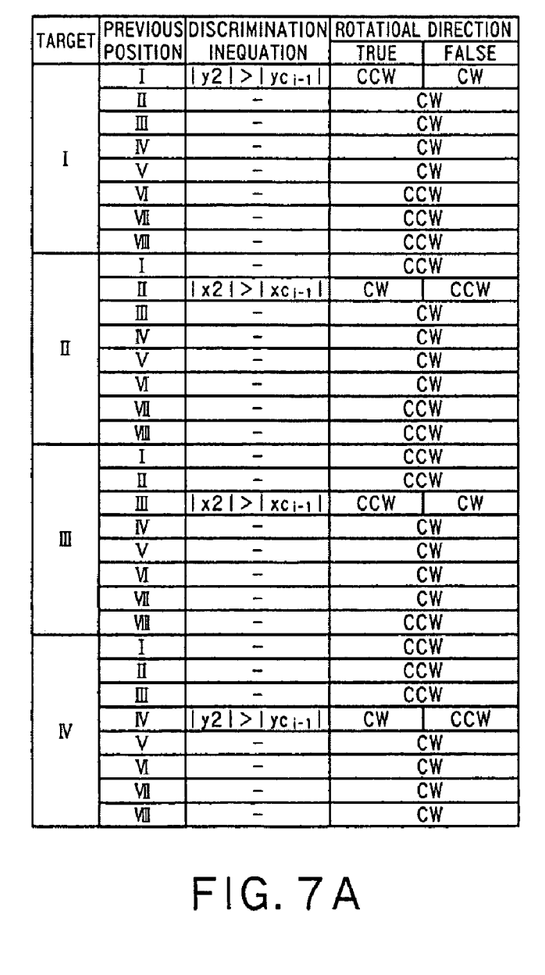
FIGS. 7A and 7B are tables for specifying rotational directions (CCW or CW) of the first and second calculational coordinates based on the areas to which the first and second actual coordinates or the first and second calculational coordinates belong.
Figure 7B:
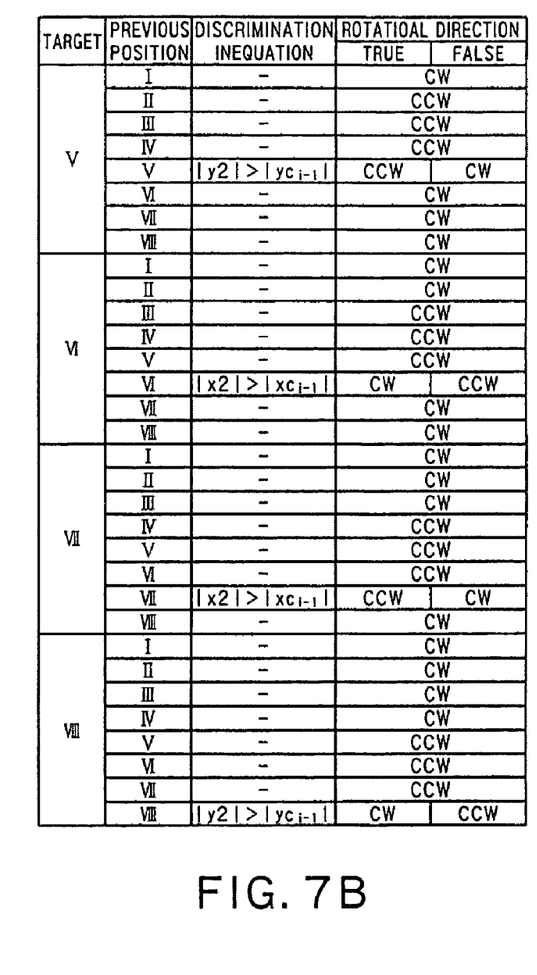

FIGS. 7A and 7B are tables for specifying rotational directions (CCW or CW) of the first and second calculational coordinates based on the areas to which the first and second actual coordinates or the first and second calculational coordinates belong. The rotational direction discriminator 53 selects the operational equation (the Equation 1 or 2) used by the rotators 51 and 58 according to the tables of FIGS. 7A and 7B.

In FIGS. 7A and 7B, "target" indicates an area to which a target coordinate belongs. One of the first actual coordinate and the second actual coordinate regards the other as a target. "Previous" in FIGS. 7A and 7B indicates an area to which the calculational coordinate ($xxc_{i-1}$, $yyc_{i-1}$) obtained by a previous calculation belongs. In the first calculation, the "previous" indicates the first actual coordinate or the second actual coordinate. For example, if the first actual coordinate belongs to the area I and the second actual coordinate belongs to the area II, the target of the first actual coordinate is the area II. Accordingly, the rotational direction discriminator 53 selects the rotational direction CCW corresponding to the "target" area of II and the "previous" area of I. Namely, the rotational direction discriminator 53 transmits a signal so that the rotator 51 selects the Equation 1. At this time, the rotator 58 selects the Equation 2.

Likewise, if the first calculational coordinate belongs to the area II and the second calculational coordinate belongs to the area I for i=1, the target of the first calculational coordinate is the area I. Accordingly, the rotational direction discriminator 53 selects the rotational direction CW corresponding to the "target" area of I and the "previous" area of II. Namely, the rotational direction discriminator 53 transmits a signal so that the rotator 51 selects the Equation 2. At this time, the rotator 58 selects the Equation 1.

If the first and second actual coordinates belong to the same area, x1 is compared with x2 or y1 is compared with y2. For example, if the first and second actual coordinates both belong to the area I, y1 is compared with y2. If y1<y2, the first actual coordinate is rotated in the CCW direction and the second actual coordinate is rotated in the CW direction.

If the first and second calculational coordinates belong to the same area, xxci in the first calculational coordinate is compared with xxci in the second calculational coordinate. Alternatively, yyci in the first calculational coordinate is compared with yyci in the second calculational coordinate. For example, if the first and second calculational coordinates both belong to the area I for i=1, xxci in the first calculational coordinate is compared with xxci in the second calculational coordinate. If xxc1 in the first calculational coordinate is greater xxc1 in the second calculational coordinate, the first calculational coordinate is rotated in the CCW direction and the second calculational coordinate is rotated in the CW direction.

In this manner, even if the first and second actual coordinates belong to the same area or the first and second calculational coordinate belong to the same area, the rotational discriminator 53 can accurately select the Equation 1 or 2.

The rotational direction discriminator 53 can be constituted by a custom LSI such as an ASIC for selection conditions shown in FIGS. 7A and 7B.

In the present embodiment, the velocity detection apparatus 100 calculates the angular velocity of the rotor. Alternatively, the velocity detection apparatus 100 can be applied to a moving body making a reciprocating motion. In this alternative, it suffices that the velocity detection apparatus 100 can convert the angular velocity obtained by the FPGA 50 into the velocity of the moving body.

According to the present embodiment, the velocity detection apparatus 100 can detect the rotational angle by doing only the addition or subtraction for the SIN signal and the COS signal without doing the division or the multiplication that conventionally and disadvantageously deteriorates accuracy for velocity detection. The velocity detection apparatus 100 can, therefore, ensure high accuracy detection. In this case, each of the Equations 1 and 2 includes the multiplication term that is a multiple of tan $\Phi_i$. However, since tan $\Phi_i = 2^{-i}$, the multiplication of tan $\Phi_i$ is equivalent to the shift of the digital value of $xxc_{i-1}$ or $yyc_{i-1}$ by i bit rightward. Accordingly, each of the rotators 51 and 58 does not actually include a multiplier but includes only a circuit that reduces the figure of the digital value.

Generally, to realize an arithmetic circuit by a logic circuit, the divider and the multiplier is far larger in circuit scale than the adder and the subtracter. In the present embodiment, the FPGA 50 includes the two rotators. By eliminating the divider and the multiplier from each of the rotators, the overall circuit scale is quite small. Further, the FPGA 50 according to the embodiment can be easily realized by the custom logic LSI since the FPGA 50 does not include the divider and the multiplier. Each of the rotators 51 and 58 in the embodiment repeatedly calculates the simple equation as stated above. The custom logic LSI is suited to make such a simple calculation at high speed. Therefore, the FPGA 50 according to the embodiment can realize acceleration of operation speed by using the custom logic LSI. In other words, the FPGA 50 according to the embodiment is particularly effective if the FPGA 50 is realized by the logic LSI.

In the present embodiment, the rotational angle register R51 can hold a value obtained by doubling the tentative angle for every calculation of the rotator 51. In this case, the value calculated by the adder 80, stored in the rotational angle register R51, and corresponding to the tentative angle can be regarded as the rotational angle of the rotor as it is.

The invention claimed is:

1. A velocity detection apparatus for regularly sampling a coordinate indicating a position of a moving body making a rotational motion or a reciprocating motion, and detecting an angular velocity of the moving body based on the coordinate, comprising:
a memory storing a plurality of preset tentative angles and a trigonometric function value corresponding to each of the preset tentative angles;
a first register storing a first actual coordinate (x1, y1) of the moving body obtained by a first sampling;
a second register storing a second actual coordinate (x2, y2) of the moving body obtained by a second sampling next to the first sampling;
a first calculator calculating a first calculational coordinate represented by an addition or a subtraction between x1 and a value obtained as a result of shifting a figure of y1 based on the trigonometric function value;
a second calculator calculating a second calculation coordinate represented by the addition or the subtraction between y2 and a value obtained as a result of shifting a figure of x2 based on the trigonometric function value; and
a third calculator adding up the tentative angles used in a calculation of the first or the second calculator, wherein
the first and the second calculators calculate the first and the second calculational coordinates respectively so that the first actual coordinate (x1, y1) and the second actual coordinate (x2, y2) are closer to each other.

2. The velocity detection apparatus according to claim 1, wherein
the first and the second calculators repeatedly calculate the first and the second calculational coordinates so that the first and the second calculational coordinates converge while reducing the tentative angles, and
the third calculator adds up the tentative angles at which the first and the second calculational coordinates converge in the calculation of the first or the second calculator, and detects the angular velocity of the moving body based on the tentative angles at which the first and the second calculational coordinates converge.

3. The velocity detection apparatus according to claim 1, wherein
the memory stores $\Phi_i$, where $\Phi_0 > \Phi_1 > \Phi_2 > \ldots > \Phi_i > \ldots \Phi_n$, $i = 0, 1, 2, \ldots, n$, and n is a natural number, as the tentative angles, and stores $\tan \Phi_i$ as the trigonometric function value,
when the first or the second calculational coordinate is ($xxc_i$, $yyc_i$), the first or the second calculational coordinate is expressed by following Equations 1 and 2:

$$xxc_i = xxc_{i-1} - yyc_{i-1} * \tan\Phi_i$$
$$yyc_i = yyc_{i-1} + xxc_{i-1} * \tan\Phi_i$$
(Equations 1)

$$xxc_i = xxc_{i-1} + yyc_{i-1} * \tan\Phi_i$$
$$yyc_i = yyc_{i-1} - xxc_{i-1} * \tan\Phi_i$$
(Equations 2)

where $\Phi_i = \tan^{-1} 2^{-i}$, ($i = 0, 1, 2, \ldots n$) and if $i = 0$, then the first calculator calculates the first calculational coordinate as $xxc_{i-1} = x1$ and $yyc_{i-1} = y1$, and the second calculator calculates the second calculational coordinate as $xxc_{i-1} = x2$ and $yyc_{i-1} = y2$,
the first and the second calculators calculate the Equations 1 or 2 in an order of $i = 0, 1, 2, \ldots, n$, and
the third calculator adds up the tentative angles for every i.

4. The velocity detection apparatus according to claim 2, wherein
the memory stores $\Phi_i$, where $\Phi_0 > \Phi_1 > \Phi_2 > \ldots > \Phi_i > \ldots \Phi_n$, $i = 0, 1, 2, \ldots, n$, and n is a natural number, as the tentative angles, and stores $\tan \Phi_i$ as the trigonometric function value,
when the first or the second calculational coordinate is ($xxc_i$, $yyc_i$), the first or the second calculational coordinate is expressed by following Equations 1 and 2:

$$xxc_i = xxc_{i-1} - yyc_{i-1} * \tan\Phi_i$$
$$yyc_i = yyc_{i-1} + xxc_{i-1} * \tan\Phi_i$$
(Equations 1)

$$xxc_i = xxc_{i-1} + yyc_{i-1} * \tan\Phi_i$$
$$yyc_i = yyc_{i-1} - xxc_{i-1} * \tan\Phi_i$$
(Equations 2)

where $\Phi_i = \tan^{-1} 2^{-i}$, ($i = 0, 1, 2, \ldots n$) and if $i = 0$, then the first calculator calculates the first calculational coordinate as $xxc_{i-1} = x1$ and $yyc_{i-1} = y1$, and the second calculator calculates the second calculational coordinate as $xxc_{i-1} = x2$ and $yyc_{i-1} = y2$,
the first and the second calculators calculate the Equations 1 or 2 in an order of $i = 0, 1, 2, \ldots, n$, and
the third calculator adds up the tentative angles for every i.

5. The velocity detection apparatus according to claim 3, wherein
the first and the second calculators alternately or complementarily calculate the Equations 1 and 2 in the order of $i = 0, 1, 2, \ldots, n$,
when the first calculator calculates the Equations 1, the second calculator calculates the Equations 2, and
when the first calculator calculates the Equations 2, the second calculator calculates the Equations 1.

6. The velocity detection apparatus according to claim 4, wherein
the first and the second calculators alternately or complementarily calculate the Equations 1 and 2 in the order of $i = 0, 1, 2, \ldots, n$,
when the first calculator calculates the Equations 1, the second calculator calculates the Equations 2, and
when the first calculator calculates the Equations 2, the second calculator calculates the Equations 1.

7. The velocity detection apparatus according to claim 2, further comprising:
a third register holding the first calculational coordinate;
a fourth register holding the second calculational coordinate; and
a fifth register holding the tentative angles added up by the third calculator.

8. The velocity detection apparatus according to claim 2, wherein a value obtained by doubling the tentative values added up by the third calculator is regarded as the angular velocity of the moving body by defining a sampling interval as a unit time.

9. The velocity detection apparatus according to claim 3, wherein a value obtained by doubling the tentative values added up by the third calculator is regarded as the angular velocity of the moving body by defining a sampling interval as a unit time.

10. The velocity detection apparatus according to claim 5, wherein a value obtained by doubling the tentative values added up by the third calculator is regarded as the angular velocity of the moving body by defining a sampling interval as a unit time.

11. The velocity detection apparatus according to claim 7, wherein a value obtained by doubling the tentative values added up by the third calculator is regarded as the angular velocity of the moving body by defining a sampling interval as a unit time.

12. The velocity detection apparatus according to claim 2, wherein the tentative angles added up by the third calculator are a half of a rotational angle of the moving body.

13. The velocity detection apparatus according to claim 3, wherein the tentative angles added up by the third calculator are a half of a rotational angle of the moving body.

14. The velocity detection apparatus according to claim 5, wherein the tentative angles added up by the third calculator are a half of a rotational angle of the moving body.

15. The velocity detection apparatus according to claim 7, wherein the tentative angles added up by the third calculator are a half of a rotational angle of the moving body.

16. The velocity detection apparatus according to claim 1, wherein velocity detection apparatus is arranged in a rotary encoder or a linear scale.

17. A velocity detection apparatus for regularly sampling a coordinate indicating a position of a moving body making a rotational motion or a reciprocating motion, and detecting an angular velocity of the moving body based on the coordinate, comprising:

a memory storing a plurality of preset tentative angles $\Phi_i$, where $\Phi_0 > \Phi_1 > \Phi_2 > \ldots > \Phi_i > \ldots \Phi_n$, i=0, 1, 2, ..., n, and n is a natural number, a trigonometric function value $\tan \Phi_i$ corresponding to each of the preset tentative angles;

a first register storing a first actual coordinate (x1, y1) of the moving body obtained by a first sampling;

a second register storing a second actual coordinate (x2, y2) of the moving body obtained by a second sampling next to the first sampling;

a first calculator calculating a following Equations 1 or 2 based on the first actual coordinate (x1, y1) and the trigonometric function value $\tan \Phi_i$ $$\left. \begin{array}{l} xxc_i = xxc_{i-1} - yyc_{i-1} * \tan\Phi_i \\ yyc_i = yyc_{i-1} + xxc_{i-1} * \tan\Phi_i \end{array} \right\} \quad \text{(Equations 1)}$$

$$\left. \begin{array}{l} xxc_i = xxc_{i-1} + yyc_{i-1} * \tan\Phi_i \\ yyc_i = yyc_{i-1} - xxc_{i-1} * \tan\Phi_i \end{array} \right\}; \quad \text{(Equatoins 2)}$$

a second calculator calculating the Equation 1 or 2 based on the second actual coordinate (x2, y2) and the trigonometric function value $\tan \Phi_i$; and a third calculator adding up the tentative angles $\tan \Phi_i$ used in a calculation of the first or the second calculator, wherein $\Phi_i = \tan^{-2} 2^{-I}$ (i=0, 1, 2, ..., n), if i=0, then $xxc_{i-1}$=x1 and $yyc_{i-1}$=y1 for the first calculator, and $xxc_{i-1}$=x2 and $yyc_{i-1}$=y2 for the first calculator, each of the first and the second calculators calculate the Equations 1 or 2 in an order of i=0, 1, 2, ..., n, and the third calculator adds up the tentative angles for every i.

18. The velocity detection apparatus according to claim 17, wherein the first and the second calculators alternately or complementarily calculate the Equations 1 and 2 in the order of i=0, 1, 2, ..., n, when the first calculator calculates the Equations 1, the second calculator calculates the Equations 2, and when the first calculator calculates the Equations 2, the second calculator calculates the Equations 1.

* * * * *